United States Patent [19]

Topper

[11] Patent Number: 5,574,513
[45] Date of Patent: Nov. 12, 1996

[54] COLOR SELECTION APERTURE CORRECTION CIRCUIT

[75] Inventor: Robert Topper, Hatboro, Pa.

[73] Assignee: Panasonic Technologies, Inc., Princeton, N.J.

[21] Appl. No.: 414,439

[22] Filed: Mar. 31, 1995

[51] Int. Cl.$^6$ ..................................................... H04N 9/64
[52] U.S. Cl. ........................... 348/652; 348/630; 348/641; 348/653; 348/645
[58] Field of Search ..................................... 348/625, 630, 348/252, 253, 256, 641, 643, 644, 645, 649, 652, 653, 654; 358/26, 27, 28, 25, 162, 518, 520; H04N 5/208, 9/64, 9/66, 9/70

[56] References Cited

U.S. PATENT DOCUMENTS

| | | | |
|---|---|---|---|
| 4,876,599 | 10/1989 | Kihara | 348/253 |
| 5,291,288 | 3/1994 | Masuda | 348/625 |
| 5,294,974 | 3/1994 | Naimpally et al. | 348/395 |
| 5,384,601 | 1/1995 | Yamashita et al. | 348/577 |

FOREIGN PATENT DOCUMENTS 6105323  4/1994  Japan .

OTHER PUBLICATIONS

Transcripts from "Morning Edition" (Monday, Dec. 5, 1994), Segment #3, *High–Tech TV Cameras Akin to Fountain of Youth*, pp. 5–8.

*Primary Examiner*—Safet Metjahic
*Assistant Examiner*—Sherrie Hsia
*Attorney, Agent, or Firm*—Ratner & Prestia

[57] ABSTRACT

A video signal processor controls aperture correction of the video signal by detecting the occurrence of particular colors in the image produced by the video signal. The particular color, for example, fleshtone, is detected as a ratio of the amplitude of an in-phase color signal and the magnitude of its corresponding quadrature phase color signal. This defines a range of color phases which are classified as the particular color, regardless of their saturation. The detected color is converted into a control signal which changes the amplitude of the aperture correction signal. In one embodiment the control signal has a value of zero if the detected color is within the range of color phases and a value of one otherwise. This control signal is used as a multiplier for the aperture correction signal. In another embodiment, a second range of colors is defined around the defined range. If the detected color is within this second range, the aperture correction signal is reduced in proportion to the difference between the detected color and the particular color.

12 Claims, 9 Drawing Sheets

COLOR SELECTION APERTURE CORRECTION CIRCUIT

BACKGROUND OF THE INVENTION

This invention concerns an apparatus for detecting the color content of a video signal and determining whether it is appropriate to perform aperture correction. In particular, it relates to the detection of skin-tones in a signal representing a color video image and a corresponding reduction or elimination of aperture correction for portions of the image containing those tones.

Aperture correction, also called contour correction or peaking, is a technique in which video signals are processed to emphasize the high frequency components of the signal relative to the low-frequency components. The higher frequency components of the signal correspond to the more sharply defined objects. When adding peaking to a signal, for example, edges of the video image are emphasized.

Psycho-optic experiments have shown that images having clearly defined edges are more pleasing to the human eye. However, more clearly defined wrinkles, blemishes, and poor skin texture are not aesthetically pleasing to the human eye. Thus, it is beneficial to have the ability to selectively perform or omit aperture correction on specific color hues in order to soften the focus on undesirable skin features.

In the television and film industry, previous methods of reducing edge detail in an image have included the placement of a gauzing over the camera lens. While this decreased the clarity of wrinkles and blemishes, it also undesirably decreased the clarity of every other portion of the image.

One method currently in use detects a selected color and brightness and inhibits the application of aperture correction in areas containing the selected color and brightness.

Additional methods of color detection in current use involve the definition of color regions designed to represent the desired colors. In FIG. 1a, the definition of a fleshtone region is illustrated by a rectangular window 110 which covers a range of hues and saturations. In actuality, the fleshtone region 112 is defined by a range of hues, independent of saturation. Thus, the rectangular window 110 covers too wide of a range of hues for low saturation and too narrow of a range of hues for high saturation. Highly saturated fleshtone signals are not detected and aperture correction occurs, resulting in the emphasis of undesirable fleshtones. Additionally, low saturation signals outside the given range of fleshtone hues are designated as fleshtone and aperture correction does not occur for more highly saturated hues in which it is desirable to perform aperture correction. If, for example, part of the area containing the selected color is in shadow while part is in full sun, aperture correction may be applied to the part that is in the shadow (low saturation) but not to the part in the sun (high saturation).

FIG. 1a illustrates an additional problem with current methods. The rectangular color region 110 is defined by hard limits. In other words, a given hue and saturation is either in the defined rectangular color region or it is not. The transition from zero aperture correction within the rectangular color region to full aperture correction outside of the rectangular color region is immediate. If two colors are similar, the color positioned immediately inside the defined rectangular color region is not emphasized while the color positioned immediately outside the color region has its edges fully emphasized.

SUMMARY OF THE INVENTION

The present invention is embodied in an aperture correction control system which modifies the output of an aperture correction system in response to the fleshtone content in the color components of a video signal. Circuitry in the system processes the video signal to produce an in-phase signal and a quadrature signal representative of the color components of the video signal. These signals are applied to circuitry in the system which determines the amplitude of the color signals and compares the ratios of these amplitudes with stored ratios representative of fleshtone hues. Aperture correction of the video signal is reduced when the ratios of the color signals correspond to the stored values.

DETAILED DESCRIPTION

Figure 1A:
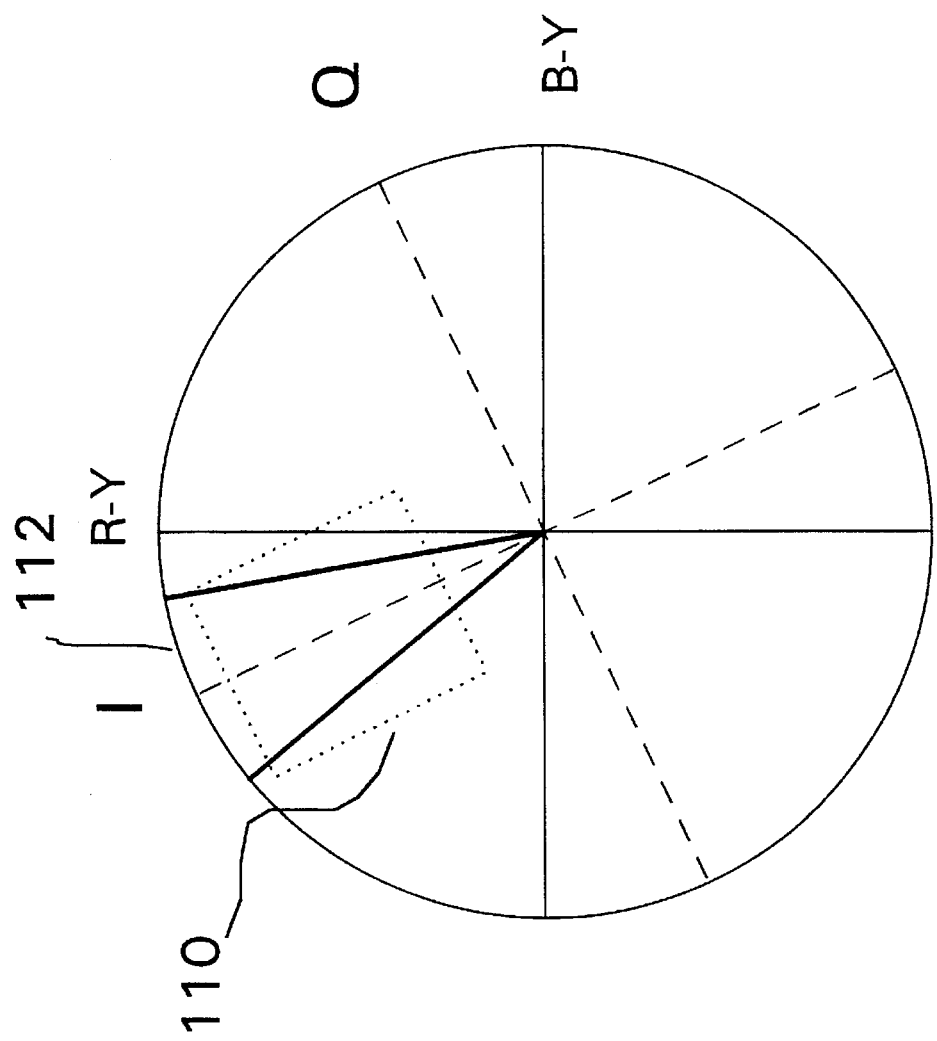
FIG. 1a (prior art) is a color-phase diagram which illustrates fleshtone detection.
Figure 1B:
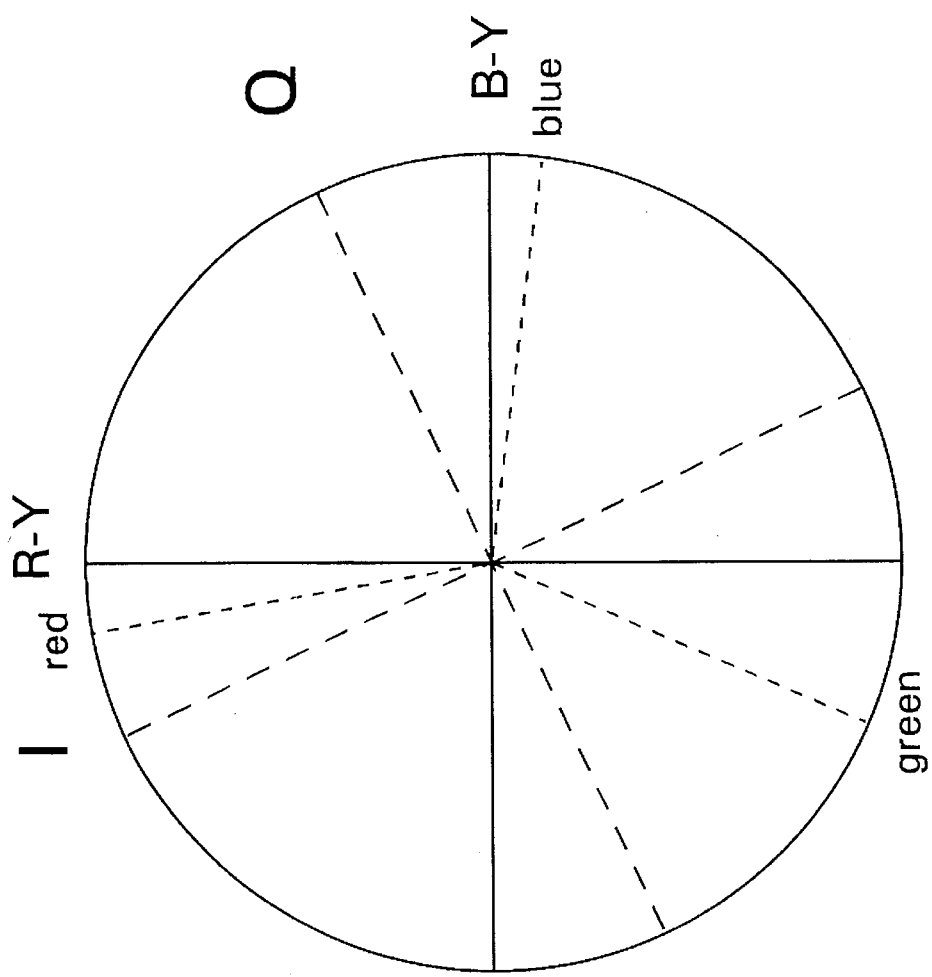
FIG. 1b is a color-phase diagram which illustrates several methods for representing color signals.

The exemplary fleshtone detection system is responsive to the color components of a video signal. The color components can take many forms including red, green, and blue color signals or a (R-Y) color-difference signal and a (B-Y) color-difference signal or an in-phase (I) color-difference signal and a quadrature (Q) color-difference signal. FIG. 1b shows the location of each of these signals on a color-phase diagram. The R-Y signal and the B-Y signal are 90 degrees apart just as the I signal and Q signal are 90 degrees apart. The transition from the R-Y, B-Y color domain to the I, Q color domain is essentially a rotation of 33 degrees. The amplitude of the color signals of a specific hue is therefore dependent upon the operative color domain.

In the exemplary fleshtone detection system, the color domain of the video signal is remapped to create a fleshtone domain, hereafter referred to as the $F_I$, $F_Q$ domain. The desired fleshtone hues are centered on the $F_I$ axis (in the NTSC system, this axis can be the same as the I axis). Color signals in the $F_I$, $F_Q$ domain are generated from the R, G, & B primary colors by combining the primary color signals in proportions determined by matrix coefficients.

Figure 2:
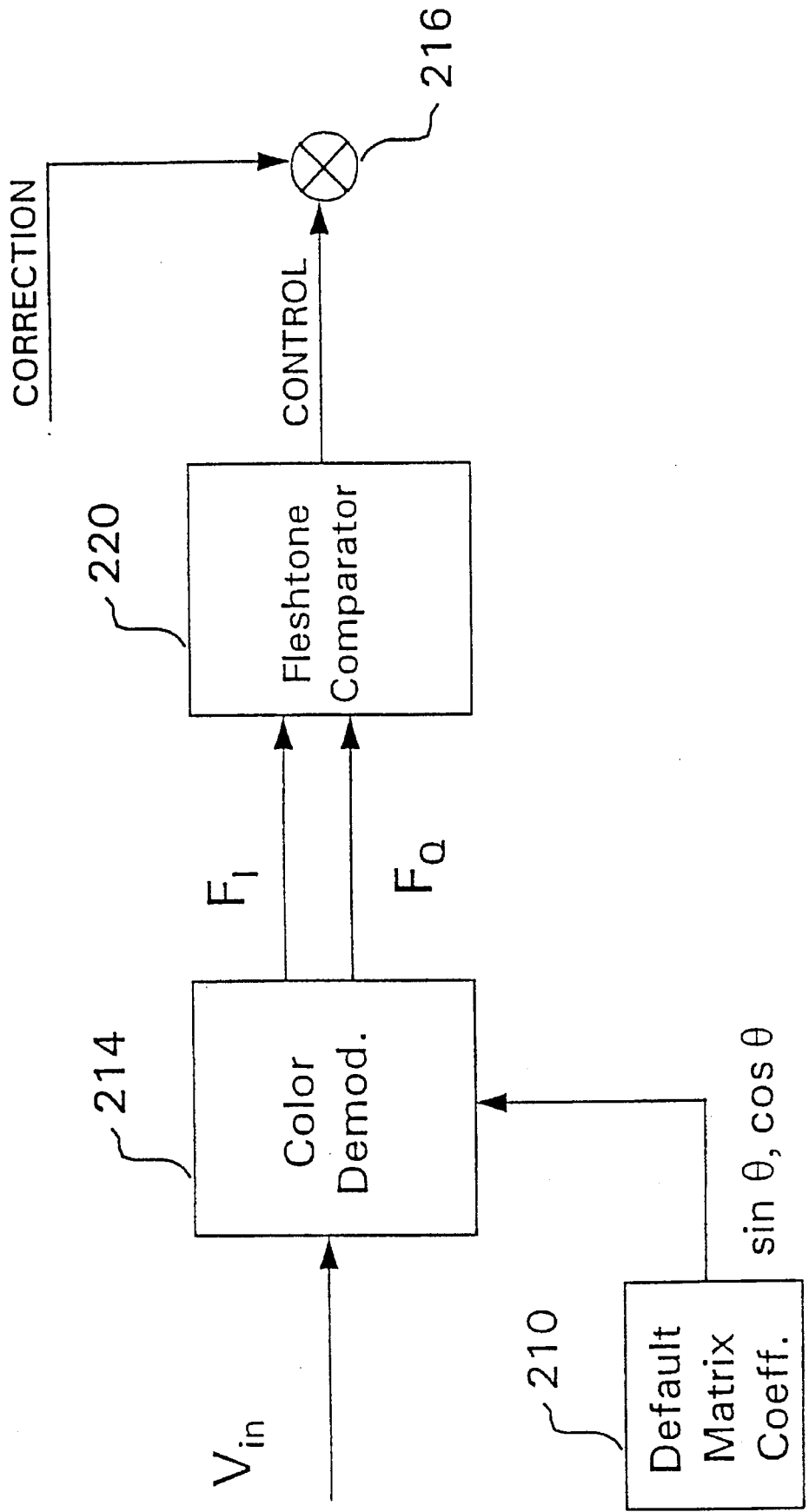
FIG. 2 is a block diagram of an exemplary fleshtone detection system.

In the exemplary fleshtone detection system shown in FIG. 2, default matrix coefficients 210 are applied to a video signal, $V_{in}$, in the color demodulator 214. The default matrix coefficients are derived from $\sin\theta$ and $\cos\theta$, where $\theta$ represents the color phase angle corresponding to the desired fleshtone hues. The value of $\theta$ is in respect to the B-Y axis.

The color demodulator produces a fleshtone in-phase signal, $F_I$, and a fleshtone quadrature signal, $F_Q$. The derivation of these coefficients is described below.

Figure 3A:
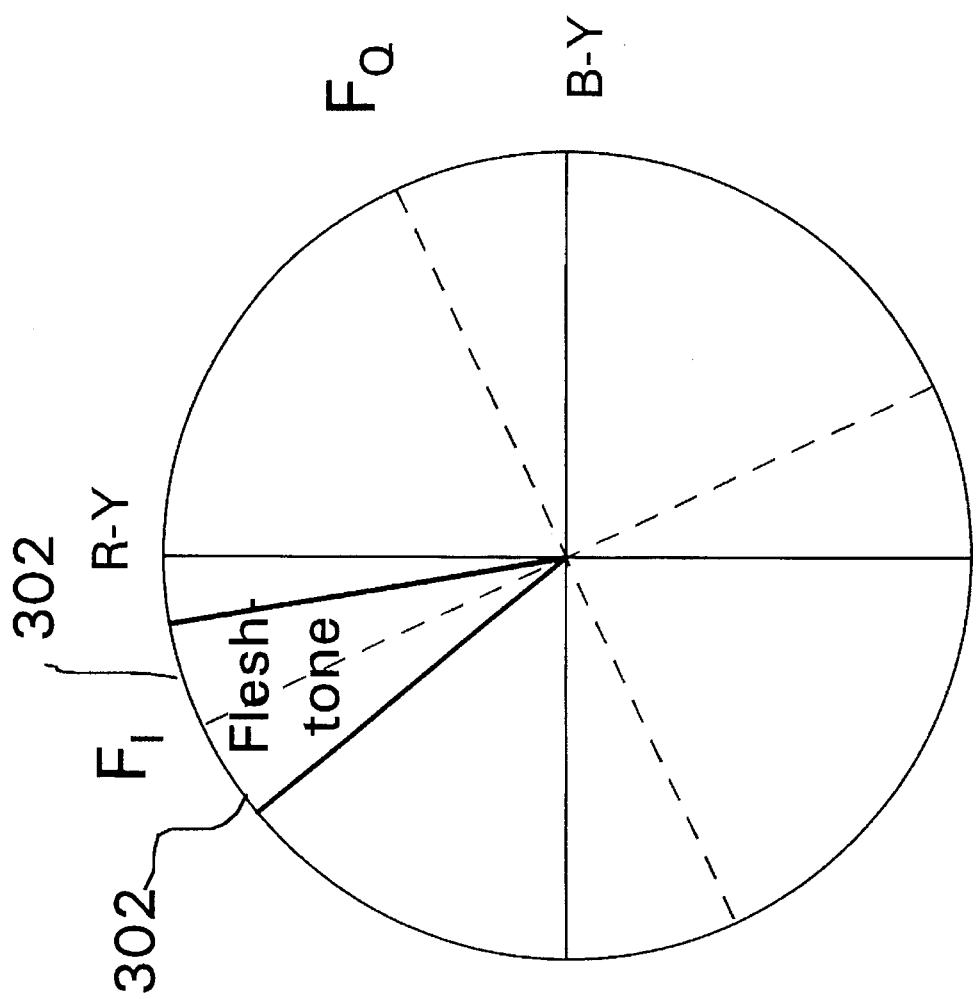
FIG. 3a is a color-phase diagram which illustrates a range of hues representative of fleshtone colors and the corresponding position of the in-phase signal and the quadrature signal.

FIG. 3a shows a color phase diagram where the fleshtone region 302 is a range of hues represented by a wedge in the color domain. The dashed lines in FIG. 3a show the projected $F_I$, $F_Q$ domain and how the projected $F_I$ axis is centered in the fleshtone region 302.

Referring to FIG. 2, the generated fleshtone in-phase signal, $F_I$, and the fleshtone quadrature signal, $F_Q$, are received by the fleshtone comparator 220. The fleshtone comparator determines the $F_I$ amplitude and the $F_Q$ magnitude.

Figure 3B:
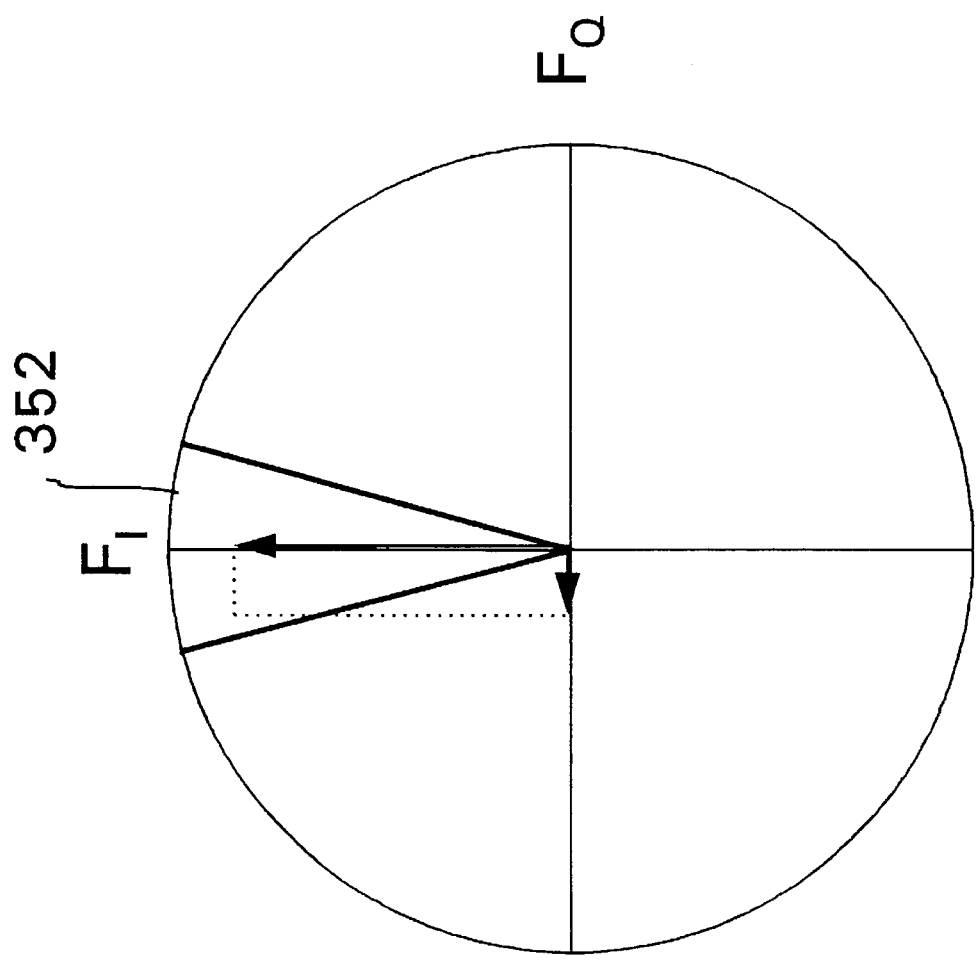
FIG. 3b is a color-phase diagram which depicts the amplitude of the in-phase signal and the magnitude of the quadrature signal in a phase-shifted coordinate system.

In FIG. 3b, a color-phase diagram helps illustrate the operation of the fleshtone detection system in the phase-shifted coordinate system. FIG. 3b depicts the $F_I$, $F_Q$ domain, the fleshtone region 352, the projection of the video signal on the $F_I$ axis, and the projection of the video signal on the $F_Q$ axis. The projection of the video signal on the $F_I$ axis is indicative of the amplitude of the $F_I$ signal. Similarly, the projection of the video signal on the $F_Q$ axis is indicative of the amplitude of the $F_Q$ signal. The absolute value of the amplitude of the $F_Q$ signal is representative of the magnitude of that signal. The fleshtone comparator 220 operates on the $F_I$ signal and the $F_Q$ signal to generate an aperture correction control signal CONTROL.

Figure 4A:
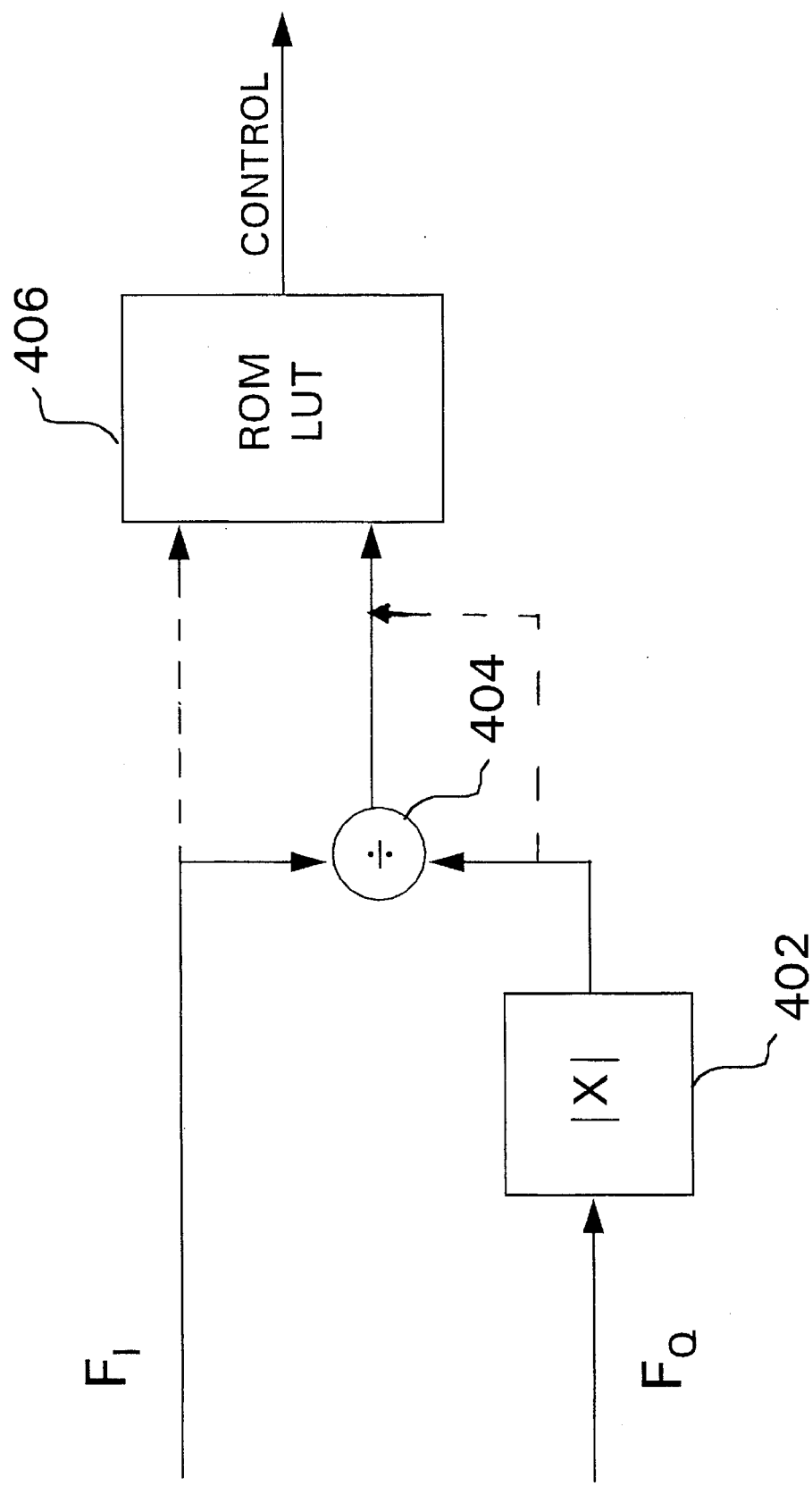
FIG. 4a is a block diagram of the fleshtone comparator.

The fleshtone comparator is depicted in FIG. 4a. The $F_Q$ signal is an input to a rectifier 402. The output of the rectifier 402 represents the magnitude of the $F_Q$ signal. This magnitude is one of two inputs to a divider 404. The other input to the divider 404 is the $F_I$ signal. The output of the divider 404 is the ratio, $F_I/|F_Q|$. The $F_I/|F_Q|$ ratio is an input to a ROM look-up table 406. The unmodified $F_I$ signal is also an input to the ROM look-up table. The output of the ROM look-up table is an aperture correction control signal CONTROL responsive to the fleshtone status of the color signals.

The ROM look-up table operates as a function of the $F_I/|F_Q|$ ratio and the $F_I$ signal. If the $F_I$ amplitude is negative, the color signal is non-fleshtone and the output of the ROM look-up table is an aperture correction control signal CONTROL having a value of 1 to allow full aperture correction. If the $F_I/|F_Q|$ ratio is less than or equal to the fleshtone $F_I/|F_Q|$ ratio stored in the ROM look-up table, then the color signal is non-fleshtone and the output of the ROM look-up table is an aperture correction control signal CONTROL having a value of 1 to allow full aperture correction. In the exemplary system, the stored fleshtone $F_I/|F_Q|$ ratio is 6. When the $F_I/|F_Q|$ ratio is greater than 6, the color signal is fleshtone and the output of the ROM look-up table is an aperture correction control signal CONTROL having a value of 0 to allow no aperture correction. By basing the fleshtone status on the $F_I/|F_Q|$ ratio, the fleshtone comparator can include all saturation levels of the fleshtone hues.

Alternatively, it is contemplated that the divider 404 may be eliminated at the expense of a larger ROM look-up table 406. In this alternative embodiment, the values $F_I$ and $|F_Q|$ are applied directly to the ROM look-up table 406, as shown in phantom, as the address input signals to the ROM. The ROM look-up table, in turn, is programmed to provide a control signal that is appropriate for the values of $F_I/|F_Q|$ based on the combined address value of $F_I$ and $|F_Q|$. In a further alternative embodiment, the absolute value circuit 402 may be eliminated by further expanding the number of values in the ROM look-up table 406.

Referring to FIG. 2, the fleshtone comparator 220 generates an aperture correction control signal CONTROL in response to the fleshtone status of the color signal. The fleshtone comparator sends the aperture correction control signal to an input of a multiplier 216. The other input of the multiplier 216 is the aperture correction signal CORRECTION. When the fleshtone comparator does not detect fleshtones, the fleshtone comparator generates an aperture correction control signal CONTROL which does not affect the output of the multiplier. In this case, the output of the multiplier is the unmodified aperture correction signal, insuring that full aperture correction of the video signal is accomplished. When the fleshtone comparator detects fleshtones, the fleshtone comparator generates an aperture correction control signal CONTROL so that the output of the multiplier is a reduced aperture correction signal. In this embodiment of the invention, the reduced aperture correction signal may cause a lower level of aperture correction to be applied to the image or may eliminate aperture correction of the image.

The rotating or re-mapping of the color signals into the $F_I$, $F_Q$ domain is dependent upon how the color signals are represented. When the color components are represented by a (R-Y) color-difference signal, Pr, and a (B-Y) color-difference signal, Pb, the generation of $F_I$ and $F_Q$ can be represented by equations 1 and 2.

$$F_I = (P_r \cdot \sin\theta) + (P_b \cdot \cos\theta) \quad (1)$$

$$F_Q = (P_r \cdot \cos\theta) - (P_b \cdot \sin\theta) \quad (2)$$

$F_I$=fleshtone in-phase signal
$F_Q$=fleshtone quadrature signal
$P_r$=(R-Y) color difference signal
$P_b$=(B-Y) color difference signal
sin θ, cos θ=default matrix coefficients
θ=color phase angle with respect to B-Y axis corresponding to a selected fleshtone hue When the color components of the video signal are represented by a red, green, and blue color signal, the generation of $F_I$ and $F_Q$ can be represented by equations 3 and 4.

$$\begin{aligned} F_I = & (0.384 \cdot \sin\Theta - 0.455 \cdot \cos\Theta)G - \\ & (0.500 \cdot \sin\Theta + 0.055 \cdot \cos\Theta)B + \\ & (0.116 \cdot \sin\Theta + 0.500 \cdot \cos\Theta)R \end{aligned} \quad (3)$$

$$\begin{aligned} F_Q = & -(0.384 \cdot \cos\Theta + 0.455 \cdot \sin\Theta)G + \\ & (0.500 \cdot \cos\Theta - 0.055 \cdot \sin\Theta)B - \\ & (0.116 \cdot \cos\Theta - 0.500 \cdot \sin\Theta)R \end{aligned} \quad (4)$$

$F_I$=fleshtone in-phase signal
$F_Q$=fleshtone quadrature signal
R=red color signal
G=green color signal
B=blue color signal
sin θ, cos θ=default matrix coefficients
θ=color phase angle with respect to B-Y axis corresponding to a selected fleshtone hue When the color components are represented by an in-phase signal and a quadrature signal, the generation of $F_I$ and $F_Q$ can be represented by equations 5 and 6.

$$F_I = (I \cdot \sin\theta) + (Q \cdot \cos\theta) \quad (5)$$

$$F_Q = (I \cdot \cos\theta) - (Q \cdot \sin\theta) \quad (6)$$

$F_I$=fleshtone in-phase signal
$F_Q$=fleshtone quadrature signal
I=in-phase color signal
Q=quadrature color signal sin θ, cos θ=default matrix coefficients θ=color phase angle with respect to B-Y axis corresponding to a selected fleshtone hue The exemplary fleshtone detection system has default matrix coefficients defining the fleshtone region; however, these default matrix coefficients may not be suitable for all desired fleshtones. The user of the fleshtone detection system may wish to generate customized matrix coefficients for a specific fleshtone. For example, a system would detect the particular fleshtone of an aging performer but not necessarily the fleshtones of other performers.

Figure 4B:
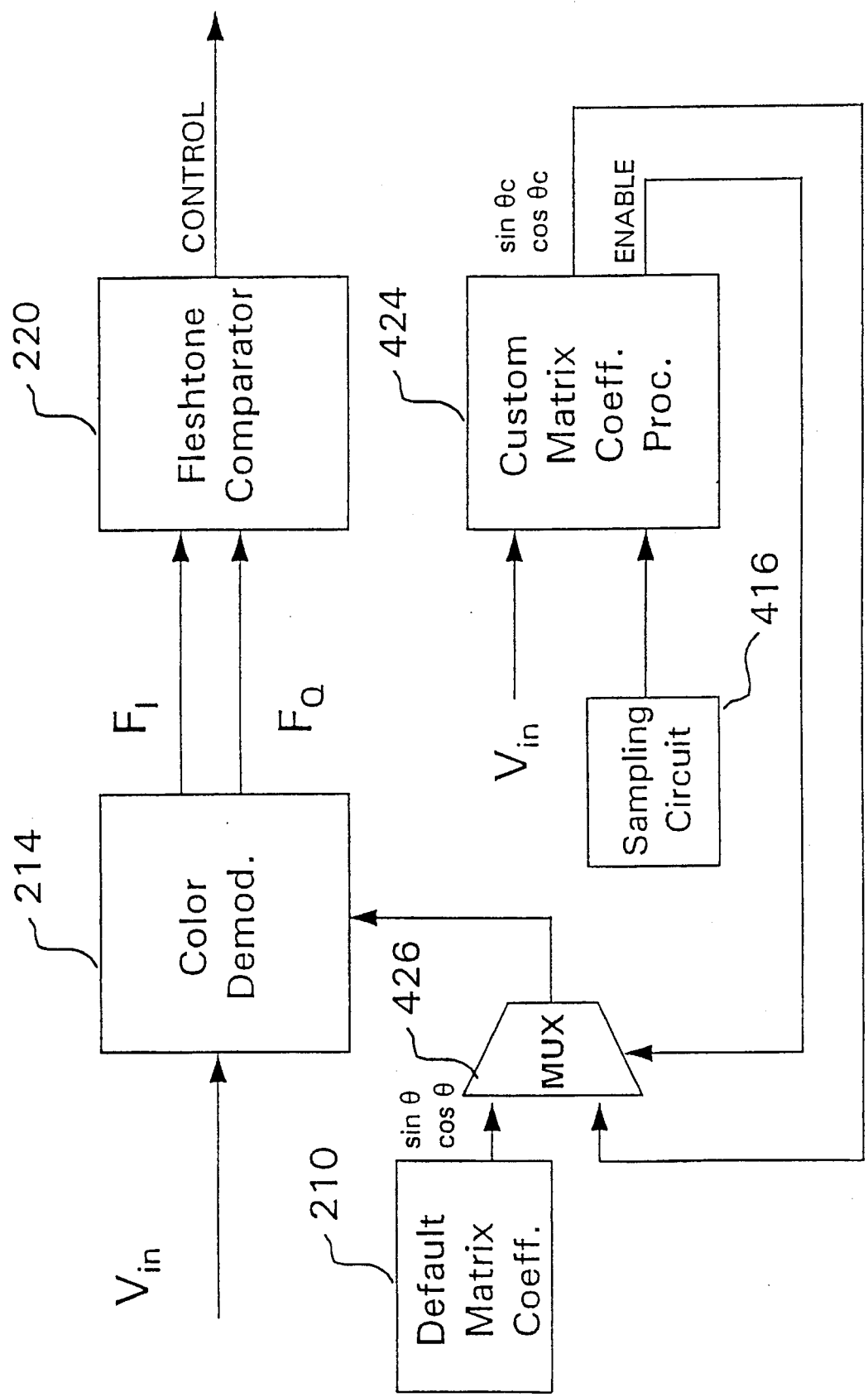
FIG. 4b is a block diagram of an exemplary fleshtone detection system which provides fleshtone sampling and the custom generation of matrix coefficients representing the sampled range of fleshtone hues.

In FIG. 4b, the custom matrix coefficient processor 424 is depicted. In this embodiment of the invention, an imaging device contains sampling circuitry 416 to provide the sampling of a small area of the video image. This area of the video image is centered on the desired fleshtones. Thus, the imaging device can sample a small number of the video image pixels representative of the desired fleshtone colors. The sample pixels are defined by the line and pixel numbers corresponding to their associated position in the video image. These samples may be designated, for example, using a light pen, a computer pointing device (e.g. a mouse or directional keys), or a touch sensitive screen.

The sampling circuitry 416 sends the positional information of the sample pixels to the custom matrix coefficient processor 424. The custom matrix coefficient processor only processes that portion of the input video signal, $V_{in}$, representative of the sampled positions. From these sample pixels, custom matrix coefficients can be derived to subsequently generate the $F_I$ and $F_Q$ signals.

In the exemplary system, the sampled area of the video image is a 5 pixel by 5 pixel section. Each sampled pixel possesses color components which can take many forms. In the exemplary system, the color components are represented by an (R-Y) color-difference signal, $P_R$, and an (B-Y) color-difference signal, $P_B$. In this case, the custom matrix coefficient processor generates the custom matrix coefficients on the basis of equations 7 and 8.

$$\sin \theta_c = P_R\text{avg}/SQRT(P_R\text{avg} \cdot P_R\text{avg} + P_B\text{avg} \cdot P_B\text{avg}) \quad (7)$$

$$\cos \theta_c = P_B\text{avg}/SQRT(P_R\text{avg} \cdot P_R\text{avg} + P_B\text{avg} \cdot P_B\text{avg}) \quad (8)$$

$\sin \theta_c$, $\cos \theta_c$=custom matrix coefficients P $\theta_c$=color phase angle with respect to B-Y axis corresponding to the sampled fleshtone hue $P_R$avg=average of the sampled red color-difference signals $P_B$avg=average of the sampled blue color-difference signals After generating the custom matrix coefficient components, the custom matrix coefficient processor 424 generates an enable signal as a control signal to a multiplexer 426. This enable signal switches the multiplexer from receiving the default matrix coefficient components to receiving the custom matrix coefficient components, $\sin \theta_c$ and $\cos \theta_c$.

Because the custom coefficients are determined by processor 424, the fleshtone compensation circuitry 220 may be used for any color that is sampled by the sampling circuitry 416.

Figure 5:
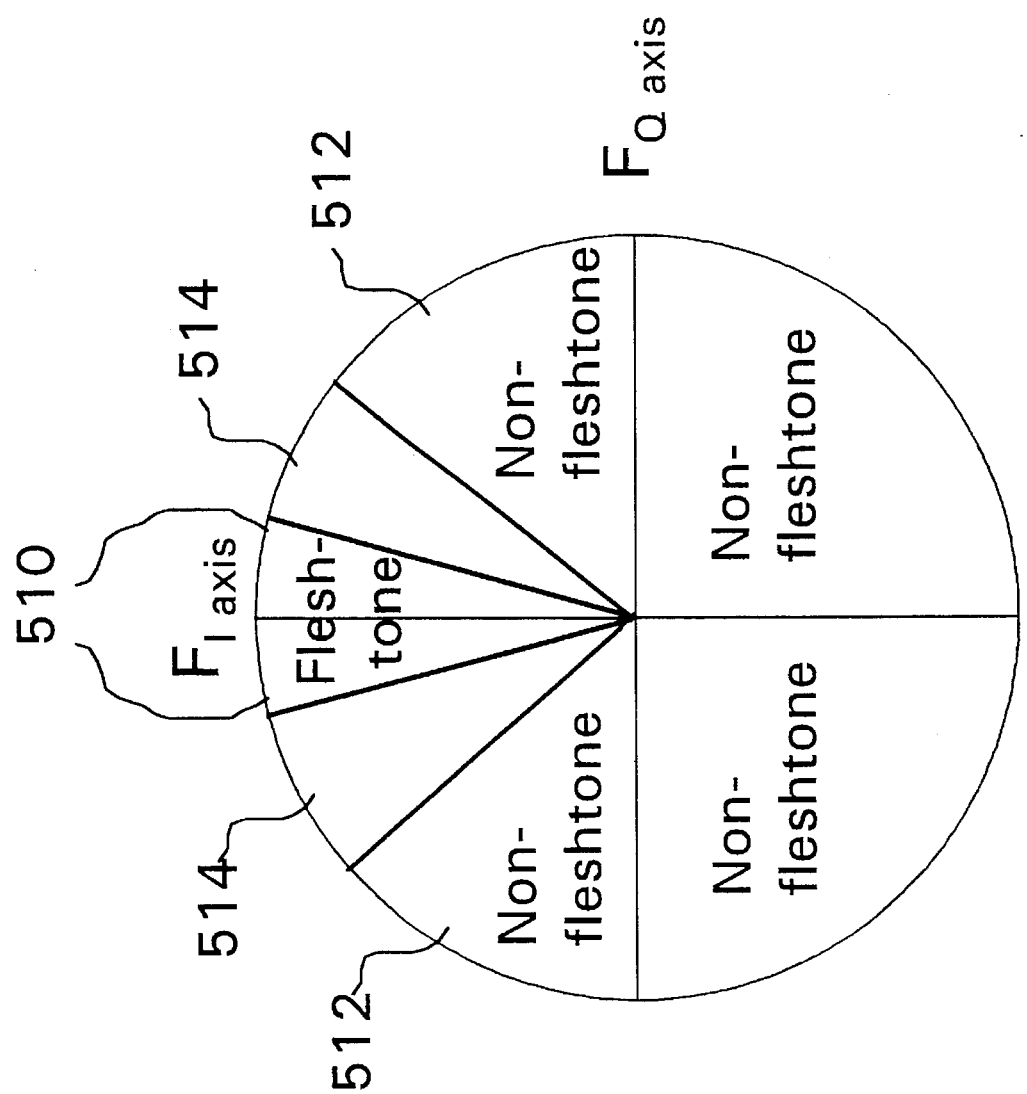
FIG. 5 is a color-phase diagram which depicts regions of fleshtone certainty in a phase-shifted coordinate system.

The fleshtone comparator can be programmed in many ways, depending upon how the aperture correction signal is to be modified. As described, the exemplary system bases aperture correction on a $F_I/|F_Q|$ ratio of 6, with full correction applied when the ratio is below 6 and no correction applied when the ratio is greater than 6. FIG. 5 provides an example of a soft delineation of the fleshtone region in the $F_I$, $F_Q$ domain. The $F_I$, $F_Q$ domain is segmented into a region of certain fleshtone colors 510, a region of certain non-fleshtone colors 512, and a region of uncertainty 514. In this case, the fleshtone comparator 220 generates an aperture correction control signal CONTROL having a value of 1 to allow full aperture correction when the video signal is in the region of certain non-fleshtone colors 512, having a value of 0 to allow no aperture correction when the video signal is in the region of certain fleshtone colors 510, and providing a aperture reduction characteristic in the region of uncertainty 514 varying from 0 to 1 dependent upon the video signal's position in the region of uncertainty 514. The reduction characteristic of the CONTROL signal in the region of uncertainty may be, for example, a linear or stepped characteristic. The reduction characteristic of the CONTROL signal in the region of uncertainty 514 may also have, for example, a value which is proportional to the difference between the $F_I/|F_Q|$ ratio and a first predetermined value when the $F_I/|F_Q|$ ratio has a value that is less than the first predetermined value and greater than a second predetermined value. The first and second predetermined values define the region of uncertainty 514.

Figure 6:
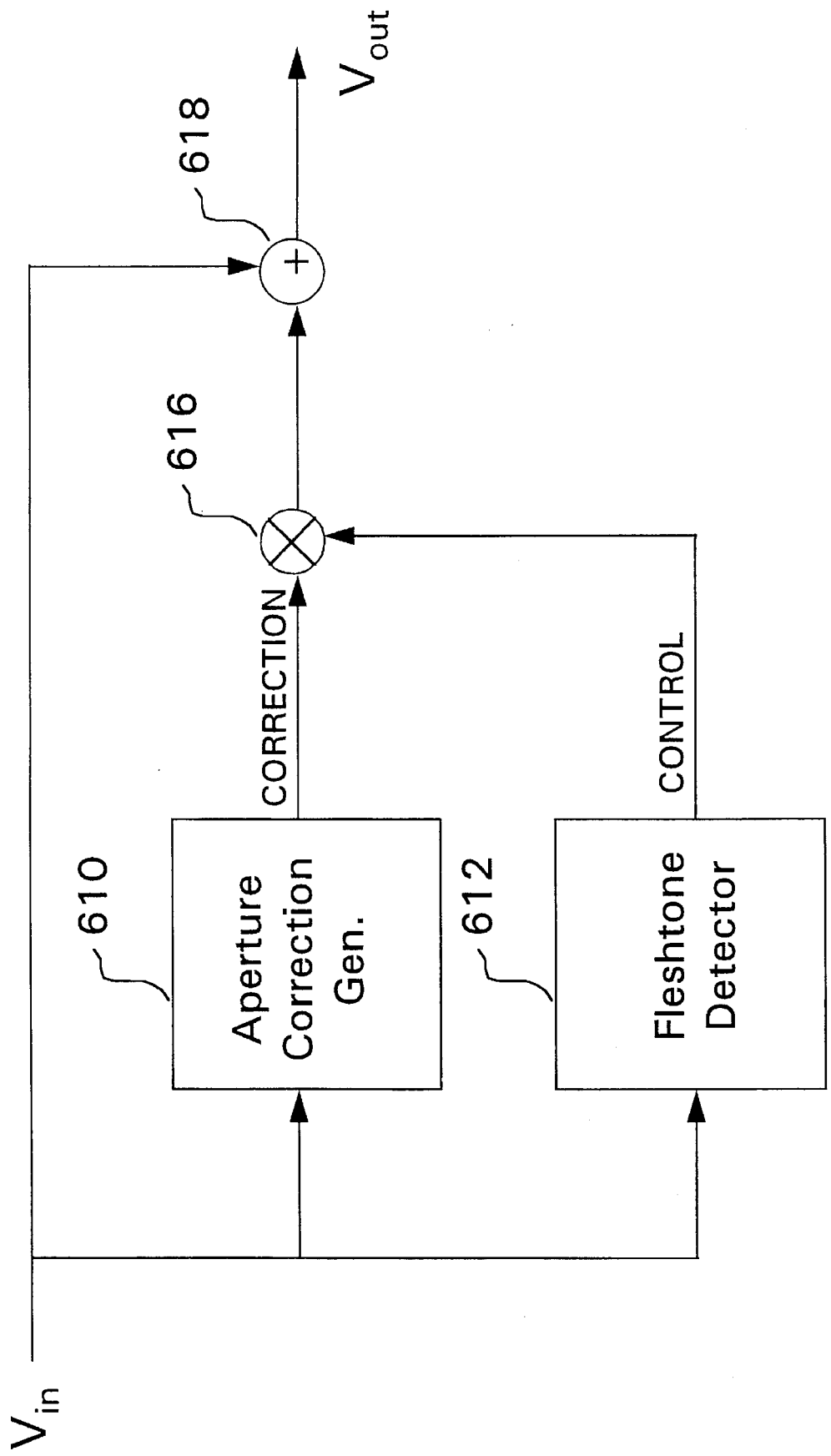
FIG. 6 is a block diagram of an exemplary aperture correction system incorporating fleshtone detection control of the output peaking signal.

It is contemplated that the fleshtone detection system may be incorporated in an aperture correction system as depicted in FIG. 6. A video input signal, $V_{in}$, is received by an aperture correction generator 610 which processes $V_{in}$ and generates an aperture correction signal. The video input signal, $V_{in}$, is also received by a fleshtone detector 612 which processes $V_{in}$ and generates an aperture correction control signal responsive to the fleshtone content of the video signal such that the aperture correction control signal has a zero value when fleshtone colors are detected and a value of 1 when no fleshtone colors are detected. The aperture correction signal and the aperture correction control signal are inputs to a multiplier 616 which outputs a controlled aperture correction signal. The controlled aperture correction signal is added to $V_{in}$ to generate an aperture corrected video signal, $V_{out}$.

Although the invention is described in terms of an exemplary embodiment, it is contemplated that it may be practiced as outlined above within the spirit and scope of the appended claims. For example, while the invention is described in terms of an adaptive peaking system for a video camera, it is contemplated that it may be implemented as an adaptive peaking circuit in a television receiver.

The invention claimed is:

1. Apparatus for processing a color video signal to control aperture correction of the color video signal, said apparatus comprising:

a source of an aperture correction signal;

color signal generating means, responsive to the color video signal, for generating an in-phase signal, having an amplitude, and a quadrature signal, having a magnitude, to represent respective color components of the color video signal;

control signal generating means, responsive to a ratio of the amplitude of the in-phase signal and the magnitude of the quadrature signal, for generating an aperture control signal having a first value when the ratio is greater than a first predetermined value and a second value when the ratio is less than a second predetermined value; and control means, coupled to the source of the aperture correction signal and responsive to the aperture control signal having said first value, for reducing the aperture correction signal in amplitude.

2. Apparatus according to claim 1 wherein the control signal generating means includes memory means, coupled to receive the in-phase signal and the quadrature signal as address values and programmed to provide control signals which are determined by the ratio of the amplitude of the in-phase signal and the magnitude of the quadrature signal.

3. Apparatus according to claim 2, wherein the in-phase signal generated by the color signal generating means has a phase which is centered within stored values representative of fleshtone colors.

4. Apparatus according to claim 1, further including:

sampling means for sampling pixels of a predetermined color in a color image represented by the color video signal;

means, responsive to the sampled pixels, for deriving color phase values representative of the color of sampled fleshtone pixels;

a multiplexer coupled to the color signal generating means, said multiplexer being responsive to a multiplexer control signal for providing one of default values representative of the color phase of a further predetermined color and the derived color phase values representative of the sampled pixels; and means, responsive to the sampling means for generating the multiplexer control signal to cause the multiplexer to provide the derived color phase values when the sampling means has sampled the pixels in the color image.

5. Apparatus for processing a color video signal to control aperture correction of the color video signal, said apparatus comprising:

a source of an aperture correction signal;

color signal generating means for generating an in-phase signal having an amplitude and a quadrature signal having a magnitude to represent respective color components of the color video signal;

control signal generating means, responsive to a ratio of the amplitude of the in-phase signal and the magnitude of the quadrature signal, for generating an aperture control signal having a value of zero when the ratio is greater than a first predetermined value and a value of unity when the ratio is less than a second predetermined value; and a multiplier which multiplies the aperture correction signal by the aperture control signal to produce a controlled aperture correction signal.

6. Apparatus according to claim 5, wherein:

the control signal has a value which is between zero and unity and which is proportional to a difference between the ratio and the first predetermined value when the ratio has a value that is less than the first predetermined value and greater than the second predetermined value.

7. Apparatus for processing a video signal to control aperture correction of the video signal which comprises:

an aperture correction system coupled to the video signal to generate an aperture correction signal;

a fleshtone detection system coupled to the video signal to generate an aperture correction control signal, the aperture correction control signal being responsive to instantaneous fleshtone content in the video signal;

a multiplier to multiply the aperture correction control signal by the aperture correction signal to produce a controlled aperture correction signal; and means for adding the controlled aperture correction signal to the video signal.

8. Method for processing a video signal to control aperture correction of the video signal by controlling an aperture correction signal, the method comprising the steps of:

generating an in-phase signal, having an amplitude, and a quadrature signal, having a magnitude, to represent respective color components of the video signal;

generating a control signal having a first value when a ratio of the amplitude of the in-phase signal and the magnitude of the quadrature signal is greater than a first predetermined value and having a second value when the ratio is less than a second predetermined value; and reducing the aperture correction of the video signal when the control signal has the first value.

9. Apparatus for processing a color video signal to control aperture correction of the color video signal, said apparatus comprising:

a source of an aperture correction signal;

color signal generating means for generating an in-phase signal having an amplitude and a quadrature signal having a magnitude to represent respective color components of the color video signal;

control signal generating means, responsive to a ratio of the amplitude of the in-phase signal and the magnitude of the quadrature signal, for generating an aperture control signal having a value of between zero and unity when the ratio has a value that is less than a first predetermined value and a value of unity when the ratio is less than a second predetermined value; and a multiplier which multiplies the aperture correction signal by the aperture control signal to produce a controlled aperture correction signal.

10. Apparatus according to claim 9, wherein:

the aperture control signal has a value which is between zero and unity when the ratio has a value that is less than the first predetermined value and greater than the second predetermined value.

11. Apparatus according to claim 10, wherein:

the aperture control signal has a value which is proportional to a difference between the ratio and the first predetermined value when the ratio is less than the first predetermined value and greater than the second predetermined value.

12. Apparatus according to claim 10, wherein:

the aperture control signal has a value which is zero when the ratio has a value that is greater than the first predetermined value.

* * * * *